(12) United States Patent
Lee et al.

(10) Patent No.: US 9,951,255 B2
(45) Date of Patent: Apr. 24, 2018

(54) TOUCH PANEL, OPTICAL MATCHING GLUE APPLIED IN TOUCH PANEL AND MANUFACTURING METHOD THEREOF

(71) Applicant: TPK Touch Solutions (Xiamen) Inc., Xiamen (CN)

(72) Inventors: Yuh-Wen Lee, Hsinchu (TW); Chun-Min Hu, Keelung (TW); Congming Chen, Xiamen (CN); Yea-Wan Chen, Hsinchu (TW); Lichun Yang, Xiamen (CN); Qiong Yuan, Xinyu (CN); Xianbin Xu, Xiamen (CN); Kwan-Sin Ho, Miaoli (TW); Hua Yun, Xiamen (CN); Feng Zhao, Xiamen (CN)

(73) Assignee: TPK Touch Solution (Xiamen) Inc., Xiamen (CN)

( * ) Notice: Subject to any disclaimer, the term of this patent is extended or adjusted under 35 U.S.C. 154(b) by 387 days.

(21) Appl. No.: 14/334,644

(22) Filed: Jul. 17, 2014

(65) Prior Publication Data
US 2015/0022740 A1 Jan. 22, 2015

(30) Foreign Application Priority Data
Jul. 17, 2013 (CN) .......................... 2013 1 0299501

(51) Int. Cl.
| | |
|---|---|
| G06F 3/044 | (2006.01) |
| C09J 133/14 | (2006.01) |
| C09J 11/04 | (2006.01) |
| G06F 1/16 | (2006.01) |
| G06F 3/047 | (2006.01) |
| C08K 3/22 | (2006.01) |
| C09J 133/04 | (2006.01) |
| C08L 33/12 | (2006.01) |

(52) U.S. Cl.
CPC ............. C09J 133/14 (2013.01); C09J 11/04 (2013.01); G06F 1/1692 (2013.01); G06F 3/044 (2013.01);
(Continued)

(58) Field of Classification Search
CPC ...... C08K 2003/2244; C08K 2201/011; C08L 33/12; C09J 133/04; C09J 11/04;
(Continued)

(56) References Cited

U.S. PATENT DOCUMENTS

| | | | | |
|---|---|---|---|---|
| 2007/0062739 | A1* | 3/2007 | Philipp | .................. G06F 3/044 178/18.06 |
| 2010/0141608 | A1* | 6/2010 | Huang | .................. G06F 3/044 345/178 |

(Continued)

FOREIGN PATENT DOCUMENTS

JP 2009120726 A * 6/2009

OTHER PUBLICATIONS

Definition of Oligomer by Merriam-Webster, Merriam-Webster, 2017 [retrieved on Apr. 5, 2017]. Retrieved from the internet <URL:https://www.merriam-webster.com/dictionary/oligomer>.*

(Continued)

*Primary Examiner* — Sophie Hon
(74) *Attorney, Agent, or Firm* — Paul David Bendemire

(57) ABSTRACT

A touch panel, comprises a substrate, a sensing layer disposed on the substrate, wherein the sensing layer includes a plurality of electrode patterns disposed on at least one surface of the substrate, and arranged in interval; an optical matching glue disposed on the sensing layer and filled in the intervals, wherein the refractive index of the optical matching glue matches the refractive index of the sensing layer. The present invention further comprises an optical matching glue and the manufacturing method thereof. When using the touch panel of the present invention, the defects of appearance caused by the refractive index difference between the electrode pattern and the intervals can be reduced without any additional process.

16 Claims, 3 Drawing Sheets

(52) U.S. Cl.
CPC ................ *G06F 3/047* (2013.01); *C08K 3/22* (2013.01); *C08K 2003/2241* (2013.01); *C08K 2003/2244* (2013.01); *C08K 2201/011* (2013.01); *C08L 33/12* (2013.01); *C09J 133/04* (2013.01); *G06F 2203/04103* (2013.01)

(58) Field of Classification Search
CPC ........... C09J 2203/326; C09J 2203/318; G06F 1/1692; G06F 203/04103; G06F 3/044
USPC .................................................. 345/173–174
See application file for complete search history.

(56) References Cited

U.S. PATENT DOCUMENTS

| | | | | |
|---|---|---|---|---|
| 2010/0271324 A1* | 10/2010 | Hayes | ................ | G06F 3/04886 345/173 |
| 2011/0242017 A1* | 10/2011 | Kang | ..................... | G06F 3/045 345/173 |
| 2012/0064336 A1* | 3/2012 | Tanaka | ...................... | C09J 4/06 428/345 |
| 2012/0113361 A1* | 5/2012 | Huang | .................. | G06F 3/041 349/96 |
| 2012/0177901 A1* | 7/2012 | Hirose | .................. | C09J 133/08 428/213 |
| 2013/0135548 A1* | 5/2013 | Burberry | ................ | G06F 3/044 349/38 |

OTHER PUBLICATIONS

Benzyl methacrylate, Sigma-Aldrich, 2017 [retrieved on Apr. 5, 2017]. Retrieved from the internet <URL:http://www.sigmaaldrich.com/catalog/product/aldrich/409448?lang=en&region=US>.*

* cited by examiner

TOUCH PANEL, OPTICAL MATCHING GLUE APPLIED IN TOUCH PANEL AND MANUFACTURING METHOD THEREOF

BACKGROUND OF THE INVENTION

This Application claims priority of the People's Republic of China Patent Application No. CN201310299501.X, filed on Jul. 17, 2013, the entirety of which is incorporated by reference herein.

FIELD OF THE INVENTION

The present invention relates to the field of touch input technologies and more particularly to a touch panel, an optical matching glue applied in a touch panel and the manufacturing method thereof.

DESCRIPTION OF THE PRIOR ART

Nowadays, personal digital assistants (PDA), mobile phones, notebook computers, tablet PCs and other portable electronic products are wildly used in modern life. Since these electronic products need to be thinner and lighter, the traditional input devices, such as keyboards or mice have to be replaced with other input devices. In addition, the needs for tablet PCs has greatly increased, hence the touch panel technology has became one of the key components in electronic products.

Generally, in a touch panel, some gaps are present between a substrate and electrode patterns formed thereon. However, the refractive index of the electrode pattern is different from the refractive index of the air or of a normal optical glue (the refractive index of air is about 1.0, the refractive index of a normal optical glue is about 1.42~1.56 and the refractive index of the material of an electrode pattern, such as indium tin oxide for example, is about 1.8~2.2). Therefore, due to the refractive index difference, some display defects may arise on the user interface, such as chromatic aberrations. In order to solve this issue, in conventional processes, an optical compensation film may further be formed on the electrode pattern after the electrode pattern is completed. The optical compensation film is filled in the gaps between the substrate and electrode pattern and then the touch panel is then attached to others components through the optical glue. Since the refractive index of the optical compensation film is relatively close to the refractive index of the electrode pattern, the display defects on the user's interface can be reduced.

However, the thickness of the touch panel will is increased when forming the optical compensation film on the electrode pattern, and the manufacturing process is more complicated.

BRIEF SUMMARY OF THE INVENTION

The present invention provides a touch panel, an optical matching glue applied in a touch panel and a manufacturing method thereof, so as to solve the issues mentioned above.

The present invention provides a touch panel, comprising: a substrate, a sensing layer disposed on the substrate, wherein the sensing layer includes a plurality of electrode patterns disposed on at least one surface of the substrate and arranged in intervals, and an optical matching glue disposed on the sensing layer and filled in the intervals, wherein the refractive index of the optical matching glue matches the refractive index of the sensing layer.

The present invention further provides a manufacturing method for forming a touch panel, at least comprising the following steps: a sensing layer is formed on at least one surface of a substrate, wherein the sensing layer includes a plurality of electrode patterns arranged in intervals, and an optical matching glue formed on the sensing layer and filling the intervals, wherein the refractive index of the optical matching glue matches the refractive index of the sensing layer.

The present invention further provides an optical matching glue used in a touch panel, wherein the touch panel at least includes an electrode pattern, and the optical matching glue comprises: acrylic resin, with a weight percentage lower than 20%, acrylic monomers, with a weight percentage of 48%~58%, and a refractive index matching material, with a weight percentage of 25%~49%, wherein the refractive index of the optical matching glue matches the refractive index of the sensing layer.

The present invention further provides a method for forming an optical matching glue used in a touch panel, wherein the touch panel at least includes an electrode pattern, and the method comprises the following steps: an acrylic resin of less than 20% weight percentage, acrylic monomers of 48%~58% weight percentage and a refractive index matching material of 25%~49% weight percentage are added in a container; and the materials mentioned above are mixed to form a mixed solution of an optical matching glue, wherein the refractive index of the optical matching glue matches the refractive index of the sensing layer.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Figure 1:
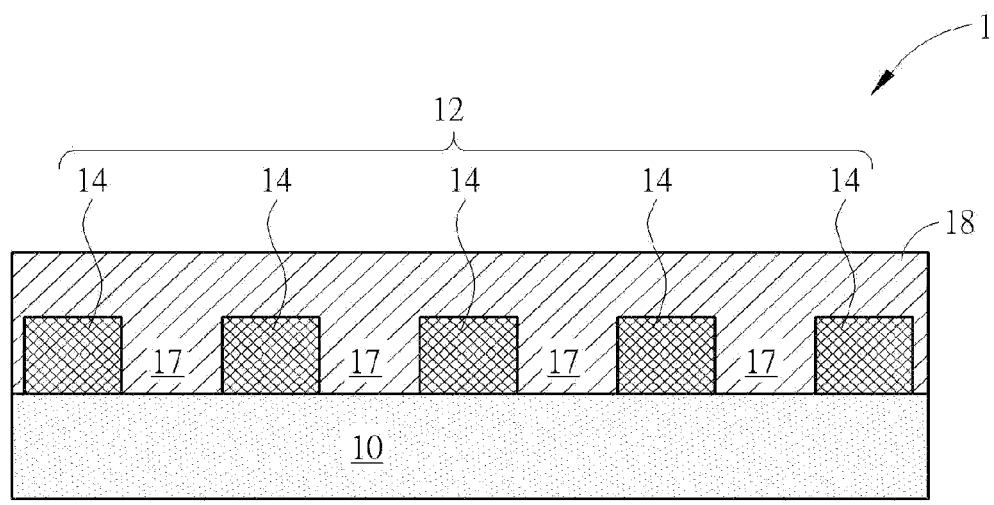
FIG. 1 is a cross sectional diagram showing an optical matching glue applied in a touch panel according to a first preferred embodiment of the present invention.

To provide a better understanding of the present invention to users skilled in the technology of the present invention, preferred embodiments are detailed as follows. The preferred embodiments of the present invention are illustrated in the accompanying drawings with numbered elements to clarify the contents and effects to be achieved.

Please note that the figures are only for illustration and the figures may not be to scale. The scale may be further modified according to different design considerations. When referring to the words "up" or "down" that describe the relationship between components in the text, it is well known in the art and should be clearly understood that these words refer to relative positions that can be inverted to obtain a similar structure, and these structures should therefore not be precluded from the scope of the claims in the present invention.

Please refer to TABLE 1, which shows the main components of the optical matching glue applied in a touch panel of the present invention. The optical matching glue mainly comprises acrylic resin, acrylic monomers and a refractive index matching material. The acrylic resin and the acrylic monomers with adhesive and transparency properties are the main components of the optical matching glue, and the refractive index matching material helps to increase the overall refractive index of the optical matching glue. The acrylic resin may comprise acrylic oligomers, urethane acrylate oligomers or a composition thereof, the acrylic monomers comprise benzene-containing acrylic monomers, and the refractive index matching material includes transparent nano-titanium dioxide, zirconium dioxide or a combination thereof.

Please refer to TABLE 2, which shows others components of the optical matching glue, including parts of a photoinitiator, parts of an optical stabilizer and parts of an adhesion promoter. The photoinitiator mentioned above is a compounds that absorb energy from UV radiations (wavelength between 250~420 nm) or from visible light (wavelength between 400~800 nm), so as to produce free radicals cations, and to initiate the polymerization cross linking. In other words, the photoinitiator can help solidify the optical matching glue. In the present embodiment, the photoinitiator may comprise 1-hydroxycyclohexyl phenyl ketone. 2,4,6-trimethyl benzoyl-diphenyl-phosphine oxide or a combination thereof. The optical stabilizer is a material that helps to decrease the degradation of the light in the plastic material. In other words, the optical stabilizer increases the light celerity in the optical matching glue, the optical stabilizer may be chosen as a hindered amine optical stabilizer. The adhesion promoter is used to increase the adhesivity of the optical matching glue, and may include an organic silicon coupling agent with a carbon double bond, acrylate with a hydroxyl group or a combination thereof, but not limited thereto; the composition may be adjusted according actual requirements.

The touch panel of the present invention at least includes an electrode pattern. The optical matching glue is not only used to attach the electrode pattern to the substrate, but is also chosen to have its refractive index to match the refractive index of the electrode pattern. I.e. the refractive index of the optical matching glue is close to or equal to the refractive index of the electrode pattern, but not limited thereto; it may also refer to other matching methods, such as complementation.

TABLE 1

| Ingredient | Weight percentage | Refractive index |
|---|---|---|
| acrylic resin | lower than 20% | 1.50 |
| acrylic monomers | 48~58% | 1.58 |
| refractive index matching material | 25%~49% | 2.10 |

TABLE 2

| Ingredient | Weight percentage | Refractive index |
|---|---|---|
| photoinitiator | 0.5%~2% | 1.50 |
| optical stabilizer | 0.5%~1% | 1.50 |
| adhesion promoter | 0.5%~1% | 1.50 |

The manufacturing method of the optical matching glue with refractive index matching function mentioned above at least comprises the following steps:

First, an acrylic resin with a weight percentage lower than 20%, an acrylic monomers with a weight percentage of 48%~58%, and a refractive index matching material with a weight percentage of 25%~49% are added in a container to form a mixed solution; the refractive index of the mixed solution matches the refractive index of the electrode pattern. In this process, the optical matching glue made of the mixed solution has a refractive index comprised between 1.8~2.1.

Besides, others materials can further be added into the mixed solution, including a photoinitiator of 0.5%~2% weight percentage, such as 1-hydroxycyclohexyl phenyl ketone or 2,4,6-trimethyl benzoyl-diphenyl-phosphine oxide or a combination thereof; an optical stabilizer of 0.5%~1% weight percentage, such as a hindered amine optical stabilizer; an adhesion promoter of 0.5%~1% weight percentage, such as an organic silicon coupling agent with carbon double bond, acrylate having with hydroxyl group or a combination thereof.

The different embodiments of the optical matching glue of the present invention will be described in the following paragraphs. It is worth noting that the materials mentioned in each different embodiment are the same as the materials mentioned above and will therefore not be redundantly described.

The optical matching glue of the $1^{st}$ embodiment is obtained as follows:

Add 20 m % of acrylic resin (weight percentage of 20%), 53 m % of acrylic monomers (weight percentage of 53%) and 25 m % of refractive index matching material (weight percentage of 25%) in a container to form a mixed solution. The mixed solution is then stirred and defoamed. In addition, 0.5 m % of photoinitiator (weight percentage of 0.5%), 0.5 m % of optical stabilizer (weight percentage of 0.5%) and 1 m % of adhesion promoter (weight percentage of 1%) are further added into the mixed solution. The mixed solution mentioned above is liquid, and in order to form the optical matching glue, the mixed solution is further coated on a substrate; a curing process is then performed to solidify the mixed solution, and to form the solid optical matching glue. In this embodiment, the curing process may include an ultraviolet irradiation step, but not limited thereto. The optical matching glue formed through the process of this embodiment has a refractive index of 1.81.

The optical matching glue of the $2^{nd}$ embodiment is obtained as follows:

Add 10 m % of acrylic resin (weight percentage of 10%), 58 m % of acrylic monomers (weight percentage of 58%) and 30 m % of refractive index matching material (weight percentage of 30%) in a container to form a mixed solution; the mixed solution is then stirred and defoamed. In addition, 0.5 m % of photoinitiator (weight percentage of 0.5%), 0.5 m % of optical stabilizer (weight percentage of 0.5%) and 1 m % of adhesion promoter (weight percentage of 1%) are further added into the mixed solution. The mixed solution mentioned above is liquid, and in order to form the optical matching glue, the mixed solution is further coated on a substrate; a curing process is then performed to solidify the mixed solution, and to form the solid optical matching glue. In this embodiment, the curing processes may include an ultraviolet irradiation step, but not limited thereto. The optical matching glue formed through the process of this embodiment has a refractive index of 1.88.

The optical matching glue of the $3^{rd}$ embodiment is obtained as follows:

Add 10 m % of acrylic resin (weight percentage of 10%), 53 m % of acrylic monomers (weight percentage of 53%) and 35 m % of refractive index matching material (weight percentage of 35%) in a container to form a mixed solution. The mixed solution is then stirred and defoamed. In addition, 0.5 m % of photoinitiator (weight percentage of 0.5%), 0.5 m % of optical stabilizer (weight percentage of 0.5%) and 1 m % of adhesion promoter (weight percentage of 1%) are further added into the mixed solution. The mixed solution mentioned above is liquid, and in order to form the optical matching glue, the mixed solution is further coated on a substrate. A curing process is then performed to solidify the mixed solution and to form the solid optical matching glue. In this embodiment, the curing processes may include an ultraviolet irradiation step, but not limited thereto. The optical matching glue formed through the process of this embodiment has a refractive index of 1.93.

The optical matching glue of the $4^{th}$ embodiment is obtained as follows:

Add 8 m % of acrylic resin (weight percentage of 8%), 48 m % of acrylic monomers (weight percentage of 48%) and 40 m % of refractive index matching material 40 g (weight percentage of 40%) in a container to form a mixed solution. The mixed solution is then stirred and defoamed. In addition, 2 m % of photoinitiator (weight percentage of 2%), 1 m % of optical stabilizer (weight percentage of 1%) and 1 m % of adhesion promoter 1 g (weight percentage of 1%) are further added into the mixed solution. The mixed solution mentioned above is liquid, and in order to form the optical matching glue, the mixed solution is further coated on a substrate. A curing process is then performed to solidify the mixed solution, and to form the solid optical matching glue. In this embodiment, the curing processes may include an ultraviolet irradiation step, but not limited thereto. The optical matching glue formed through the process of this embodiment has a refractive index of 1.97.

The optical matching glue of the $5^{th}$ embodiment is obtained as follows:

Add 4 m % of acrylic resin (weight percentage of 4%) 49 m % of acrylic monomers (weight percentage of 49%) and 45 m % of refractive index matching material (weight percentage of 45%) in a container to form a mixed solution. The mixed solution is then stirred and defoamed. In addition, 0.5 m % of photoinitiator (weight percentage of 0.5%), 1 m % of optical stabilizer (weight percentage of 1%) and 0.5 m % of adhesion promoter (weight percentage of 0.5%) are further added into the mixed solution. The mixed solution mentioned above is liquid, and in order to form the optical matching glue, the mixed solution is further coated on a substrate. A curing process is then performed to solidify the mixed solution, and to form the solid optical matching glue. In this embodiment, the curing processes may include an ultraviolet irradiation step, but not limited thereto. The optical matching glue formed through the process of this embodiment has a refractive index of 2.03.

The optical matching glue of the $6^{th}$ embodiment is obtained as follows:

Add 49 m % of acrylic monomers (weight percentage of 49%) and 49 m % of refractive index matching material (weight percentage of 49%) in a container to form a mixed solution. The mixed solution is then stirred and defoamed. In addition, 0.5 m % of photoinitiator (weight percentage of 0.5%) 1 m % of optical stabilizer (weight percentage of 1%) and 0.5 m % of adhesion promoter (weight percentage of 0.5%) are further added into the mixed solution. The mixed solution mentioned above is liquid, and in order to form the optical matching glue, the mixed solution is further coated on a substrate. A curing process is then performed to solidify the mixed solution, and to form the solid optical matching glue. In this embodiment, the curing processes may include an ultraviolet irradiation step, but not limited thereto. The optical matching glue formed through the process of this embodiment has a refractive index of 2.09.

The formulas in each embodiment mentioned above can be adjusted; the present invention is not limited thereto. The proportional concentration or dilution of each formula mentioned above is comprised in the scope of the present invention too.

According to each embodiment mentioned above, the refractive index of the optical matching glue is comprised between 1.8~2.1, and the refractive index of the electrode pattern in conventional processes (such as indium tin oxide, nanosilver and carbon nanotubes) is also comprised between 1.8~2.2. In other words, the refractive index of the optical matching glue matches the refractive index of the electrode pattern. In an ideal situation, the refractive index difference between the optical matching glue and the electrode patterns is lower than 0.2.

The touch panel of the $1^{st}$ embodiment is formed as follows:

Please refer to FIG. 1; FIG. 1 is a cross sectional diagram showing an optical matching glue applied in a touch panel according to the first preferred embodiment of the present invention. As shown in FIG. 1, a touch panel 1 includes a substrate 10, a sensing layer 12 and an optical matching glue 18. The sensing layer 12 is disposed on the substrate 10 and includes a plurality of electrode patterns 14 arranged in intervals. The electrode patterns 14 are disposed on at least one surface of the substrate 10 and a plurality of gaps 17 exists between each two adjacent electrode patterns 14. The optical matching glue is disposed on the sensing layer 12 and filled into the gaps 17. The refractive index of the optical matching glue 18 matches the refractive index of the electrode patterns 14, therefore, the optical matching glue 18 has an adhesive function and a refractive index matching function simultaneously, thereby avoiding display defects caused by differences in refractive index without adding any optical compensation film, i.e. not increasing the thickness of the touch panel and the process complexity. The material of the substrate 10 comprises a rigid or a flexible substrate, such as glass, polycarbonate (PC), polyethylene terephthalate (PET), polymethylmesacrylate (PMMA), polysulfone (PES) or other cyclic olefin copolymer materials; the electrode patterns 14 of the sensing layer 12 comprise a single layer electrode structure, which is arranged along at least one direction, or a double layer electrode structure, which is arranged along at least two directions. The material of the electrode patterns 14 comprises indium tin oxide, indium zinc oxide, aluminum zinc oxide, nano silver, carbon nanotubes, poly(3,4-ethylenedioxythiophene)-polystyrene sulfonic acid (PEDOT:PSS), zinc oxide dopant or a combination thereof. The refractive index of the optical matching glue 18 matches the refractive index of the electrode pattern 14, as it has been described in the embodiments mentioned above.

According to the stacked structure of the touch panel mentioned above, the corresponding manufacturing method includes:

First, the electrode patterns 14 are formed on the substrate 10, the optical matching glue 18 is then formed on the electrode patterns 14 and filled into the gaps 17 to complete the touch panel 1. The method for forming the optical matching glue 18 on the sensing layer 12 includes attaching a solid optical matching glue film on the sensing layer directly, or coating a liquid optical matching glue on the sensing layer 12. A curing process is then performed, since the optical matching glue 18 formed on the sensing layer 12 is liquid, so it has a relative flat surface, further decreasing the display defects caused by the height difference. It is worth nothing that the optical matching glue 18 in this embodiment includes refractive index matching materials of 25 m %~49 m % (weight percentage) and the refractive index matching materials comprise transparent titanium dioxide, zirconium dioxide nano or a combination thereof. By adjusting the quantity of the refractive index matching materials, the whole refractive index of the optical matching glue 18 can be modified so as to match those of the electrode patterns 14. Generally, the refractive index difference between the optical matching glue 18 index and the sensing layer 12 index is lower than 0.2.

The following description will detail the different embodiments of the touch panel of the present invention. To simplify the description, the following description will detail the dissimilarities among the different embodiments and the identical features will not be redundantly described. In order to compare the differences between the embodiments easily, the identical components in each of the following embodiments are marked with identical symbols.

Figure 2:
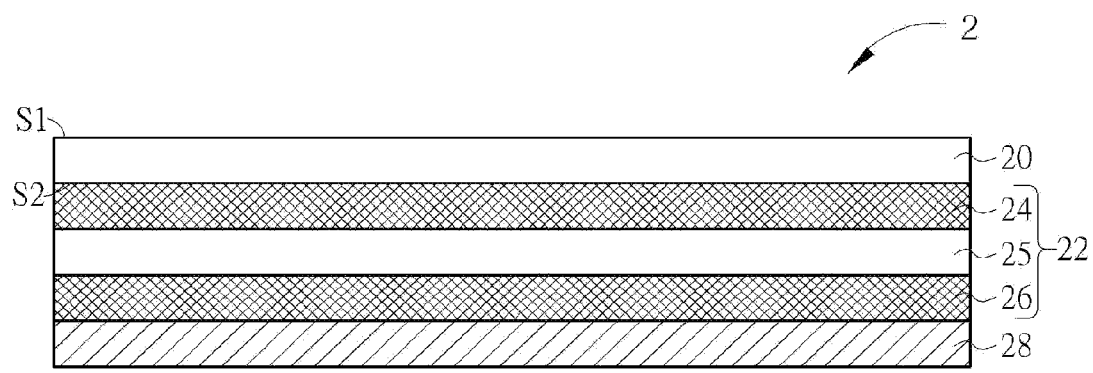
FIG. 2 is a cross sectional diagram showing an optical matching glue applied in a touch panel according to a second preferred embodiment of the present invention.

The touch panel of the 2$^{nd}$ embodiment is formed as follows:

FIG. 2 is a cross sectional diagram showing an optical matching glue applied in a touch panel according to the second preferred embodiment of the present invention. A touch panel 2 includes a substrate 20, a sensing layer 22 and an optical matching glue 28. In this embodiment, the substrate 20 is a cover lens, the sensing layer 22 is formed on a surface S2 of the substrate 20, and a surface S1 opposite to the surface S2 where the sensing layer 22 is disposed on is a touching surface. The sensing layer 22 mainly comprises a plurality of first electrode patterns 24, a plurality of second electrode pattern 26, an insulating layer 25 disposed between the first electrode patterns 24 and the second electrode patterns 26. The first electrode patterns 24 and the second electrode patterns 26 comprised in the sensing layer 22 shown in FIG. 2 are disposed on different levels to form a double layer electrode structure. In this embodiment, each first electrode pattern 24 is arranged in intervals, and each second electrode pattern 26 is arranged in intervals too. A plurality of gaps exists between every two adjacent first electrode patterns 24 or every two adjacent second electrode patterns 26. However, in another embodiment of the present invention, the first electrode patterns 24 and the second electrode patterns 26 can be disposed on a same level to form a single layer electrode structure. In this structure, the first electrode patterns 24 and the second electrode patterns 26 are arranged in intervals, and a plurality of gaps exists between the first electrode patterns 24 and the second electrode patterns 26. In the present invention, whether the sensing layer 22 is a single layer electrode structure or a double layer electrode structure, it is only disposed on a surface of the substrate 20 to detect the signals of different directions. Besides, the optical matching glue 28 is filled in the gaps mentioned above. The refractive index of the optical matching glue 28 matches the refractive index of the first electrode patterns 24 and the second electrode patterns 26, the material of the optical matching glue 28 are as described above and will not redundantly described here.

The manufacturing method of the touch panel 2 comprises the following steps: First, the substrate 20 is provided, such as strengthened glass or other transparent rigid substrates, the sensing layer 22 is then formed on a surface of the substrate 20. The sensing layer 22 includes the first electrode patterns 24 and the second electrode patterns 26, wherein each first electrode pattern 24 and each second electrode pattern 26 may be perpendicular to each other and electrically isolated from each other through the insulating layer 25. The first electrode patterns 24 and the second electrode patterns 26 are used to detect the signals of X-direction and Y-direction respectively, but not limited thereto. The material of the first electrode patterns 24 and the second electrode patterns 26 comprises transparent conductive materials such as indium tin oxides (ITO), indium zinc oxide (IZO), zinc oxide doping 3 oxidation 2 aluminium (AZO), nano silver nano conductive atoms, carbon nanotubes (Poly(3,4-ethylenedioxythiophene)poly(styrene sulfonate) (PEDOT:PSS), zinc oxide dopant, or others suitable transparent conductive materials. The material of the insulating layer 25 comprises polyimide (PI), ink, silicon nitride silicon oxide and/or others non-conductive materials so as to electrically isolate the electrode pattern arranged along different directions. Afterwards, the optical matching glue 28 is formed on the surface of the sensing layer 22 to complete the touch panel 2. The material of the optical matching glue 28 is described above and will not be redundantly described here. The method for forming the optical matching glue 28 on the sensing layer 22 includes attaching a solid optical matching glue film on the sensing layer directly or coating a liquid optical matching glue on the sensing layer 22 and a curing process is then performed, wherein both methods are comprised in the scope of the present invention. Then, the touch panel can be attached to a display module (such as a liquid crystal display, LCD) through the optical matching glue 28 thereby completing a touch display module.

In this way, the touch panel 2 includes a substrate 20, a sensing layer 22 (including the first electrode patterns 24, the second electrode patterns 26 and the insulating layer 25) formed on the substrate, an optical matching glue 28 formed on the sensing layer. It is worth noting that since the refractive index of the optical matching glue 28 matches the refractive index of the first electrode patterns 24 and the second electrode patterns 26 (preferably, the refractive index difference is lower than 0.2), therefore display defects, such as chromatic aberrations, can be reduced. Besides, since the substrate 20 is a cover lens and the first electrode patterns 24 and the second electrode patterns 26 are formed on the cover lens directly, the touch panel is a touch on lens (TOL) structure. In this embodiment, the substrate 20 is preferably a strengthened glass, so as to provide a larger structural strength.

Figure 3:
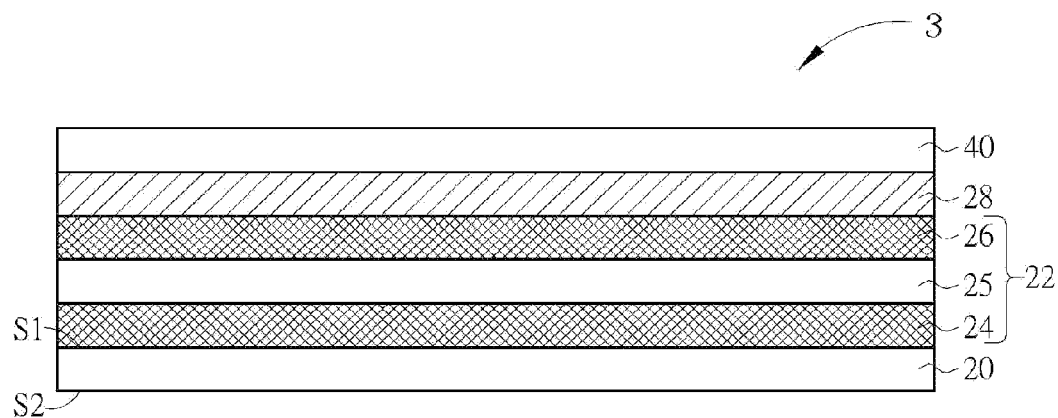
FIG. 3 is a cross sectional diagram showing an optical matching glue applied in a touch panel according to a third preferred embodiment of the present invention.

The touch panel of the 3$^{rd}$ embodiment is formed as follows:

FIG. 3 is a cross sectional diagram showing an optical matching glue applied in a touch panel according to the third preferred embodiment of the present invention. A touch panel 3 includes the substrate 20, the sensing layer 22 and the optical matching glue 28. The difference between this embodiment and the 2$^{nd}$ embodiment is that the touch panel 3 further comprises a cover lens 40. The first electrode patterns 24, the insulating layer 25 and the second electrode patterns 26 are disposed on the surface S1 of the substrate 20, and the optical matching glue 28 is disposed between the sensing layer 22 and the cover lens 40. In other words, the substrate 20 and the cover lens 40 are attached to each other through the optical matching glue 28. The sensing layer 22 and the optical matching glue 28 are the same as the ones mentioned in the $2^{nd}$ embodiment, and will not be redundantly described here. The material of the cover lens 40 and the substrate 20 can be the same or of different material, not limited to rigid substrates or flexible substrates, such as glass, polycarbonate (PC), polyethylene terephthalate (PET), polymethylmesacrylate (PMMA), polysulfone (PES) or other cyclic olefin copolymer materials. The other components of this embodiment are substantially similar to the components of the $2^{nd}$ embodiment. In addition, the touch panel 3 may further comprise an optical glue (not shown) disposed on the surface S2 of the substrate 20 in order to attach a display module (not shown). Since the optical glue is not attached to the sensing layer, the optical glue is not limited to the optical matching glue of the present invention; it may be a normal optical glue without refractive index matching function as well as an optical matching glue of the present invention.

The manufacturing method of the touch panel 3 comprises the following steps: First, the sensing layer 22 is formed on the surface S1 of the substrate 20, the optical matching glue 28 is then formed on the sensing layer and a cover lens 40 is covered on the optical matching glue 28 to complete the touch panel 3. It is worth noting that, since the touch panel 3 of the embodiment does not have a touch on lens (TOL) structure, the cover lens 40 material is not limited to strengthened glass; it may comprise normal glass other flexible materials. The other components, material properties, and manufacturing methods of the touch panel 3 are similar to those of the touch panel of the $2^{nd}$ preferred embodiment detailed above and will not be redundantly described. Besides, the touch panel can be attached to a display module (not shown) through an optical matching glue or a normal optical glue, thereby completing a touch display module.

Figure 4:
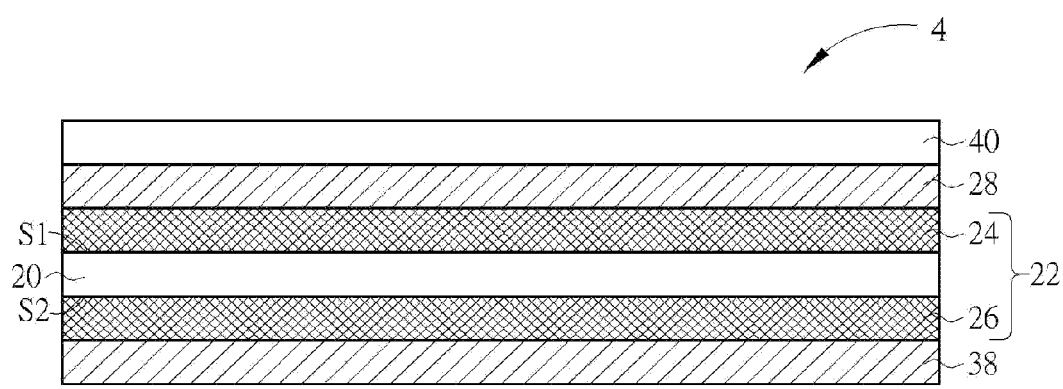
FIG. 4 is a cross sectional diagram showing an optical matching glue applied in a touch panel according to a fourth preferred embodiment of the present invention.

The touch panel of the $4^{th}$ embodiment is formed as follows:

FIG. 4 is a cross sectional diagram showing an optical matching glue applied in a touch panel according to the fourth preferred embodiment of the present invention. The touch panel 4 includes the substrate 20, the sensing layer 22 and the optical matching glue 28, and further comprises the cover lens 40 and the optical matching glue 38. However, the sensing layer 22 of the touch panel 4 does not include an insulating layer. The first electrode patterns 24 and the second electrode patterns 26 of the sensing layer 22 are disposed on two sides of the substrate 20. In other words, the first electrode patterns 24 are disposed on the surface S1 of the substrate 20, and the second electrode patterns 26 are disposed on the surface S2 of the substrate 20. In this embodiment, both the optical matching glue 28 and the optical matching glue 38 are optical matching glue with refractive index matching function, and are disposed on the first electrode patterns 24 and the second electrode patterns 26 respectively. The optical matching glue 28 is disposed between the cover lens 40 and the substrate 20 so as to attach them to each other. The other components, material properties, and manufacturing methods of the touch panel 4 are similar to those of the touch panel of the $3^{rd}$ preferred embodiment detailed above and will not be redundantly described.

The manufacturing method of the touch panel 4 comprises the following steps: First, the first electrode patterns 24 are formed on the surface S1 of the substrate 20, and the second electrode patterns 26 are formed on the surface S2 of the substrate 20, wherein the first electrode patterns 24 and the second electrode patterns 26 can be formed at a same time or different times. Afterwards, the optical matching glue 28 is formed on the surface of the first electrode patterns 24 to attach the cover lens 40; the optical matching glue 38 is formed on the surface of the second electrode patterns 26, wherein the optical matching glue 28 and the optical matching glue 38 can be formed simultaneously or at different times. Finally, the cover lens 40 and the substrate 20 are attached to each other thereby completing the touch panel 4. In addition, a display module (not shown) can be attached to the touch panel through the optical matching glue 38, so as to form a touch display module, wherein the cover lens 40 and the display module can be attached simultaneously or at different times. In this embodiment, the substrate 20 is used to replace the insulating layer, so the insulating layer does not need to be formed. The other components, material properties, and manufacturing methods of the touch panel 4 are similar to those of the touch panel of the $3^{rd}$ preferred embodiment detailed above and will not be redundantly described.

Figure 5:
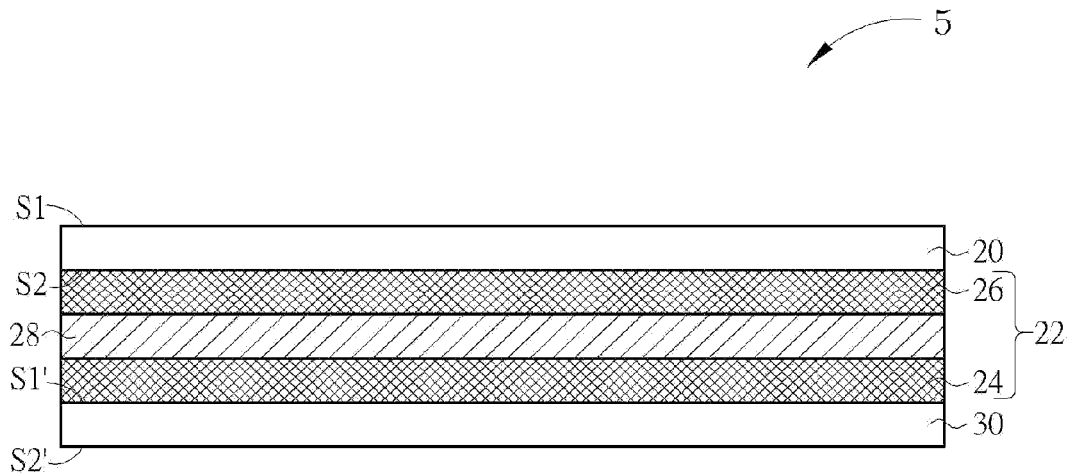
FIG. 5 is a cross sectional diagram showing an optical matching glue applied in a touch panel according to a fifth preferred embodiment of the present invention.

The touch panel of the $5^{th}$ embodiment is formed as follows:

FIG. 5 is a cross sectional diagram showing an optical matching glue applied in a touch panel according to the fifth preferred embodiment of the present invention. A touch panel 5 includes the substrate 20, the sensing layer 22 and the optical matching glue 28; the difference between this embodiment and the $4^{th}$ embodiment is that the touch panel 5 further comprises another substrate 30. The material of the substrate 20 and the substrate 30 can be same or not, like rigid substrates or flexible substrates, such as glass, polycarbonate (PC), polyethylene terephthalate (PET), polymethylmesacrylate (PMMA), polysulfone (PES) or other cyclic olefin copolymer materials. The first electrode patterns 24 are disposed on the substrate 20, whereas the second electrode patterns 26 are disposed on the substrate 30, against to the electrode patterns 24. In other words, the first electrode patterns 24 are disposed on the surface S2 of the substrate 20, and the second electrode patterns 26 are disposed on the surface S1' of the substrate 30; the optical matching glue 28 is disposed between the first electrode patterns 24 and the second electrode patterns 26; the optical matching glue 28 is filled in the gaps between each first electrode pattern 24 and each second electrode pattern 26. In other words, the surface S2 of the substrate 20 is attached to the surface S1' of the substrate 30 through the optical matching glue 28. In another embodiment of the present invention, the other surface S1 opposite to the first electrode patterns 24 of the substrate 20 is the touching surface. Besides, another surface S2' of the substrate 30 can be attached to a display module through the optical matching glue.

In another embodiment of the present invention (not shown), the touch panel 5 further comprises a cover lens, attached on the surface S1 of the substrate 20 through an optical matching glue or a normal optical glue.

The manufacturing method of the touch panel 5 comprises the following steps: first, the first electrode patterns 24 is formed on the surface S2 of the substrate 20; the second electrode patterns 26 are formed on the surface S1' of the substrate 30, wherein the first electrode patterns 24 and the second electrode patterns 26 can be formed at a same time or different times. Afterwards, the optical matching glue 28 is formed on the surface of the first electrode patterns 24 or on the surface of the second electrode patterns 26 to attach the substrate 20 to the substrate 30, thereby completing the touch panel 5. Then, the surface S1 of the substrate 20 can be attached to a cover lens through an optical matching glue or a normal optical glue, and/or the surface S2' of the substrate 30 can be attached to a display module through an optical matching glue or a normal optical glue. The cover lens and the display module may exist individually or simultaneously, they can also be attached simultaneously or separately. The other components, material properties, and manufacturing methods of the touch panel 5 are similar to those of the touch panel of the 4$^{th}$ preferred embodiment detailed above and will not be redundantly described.

Figure 6:
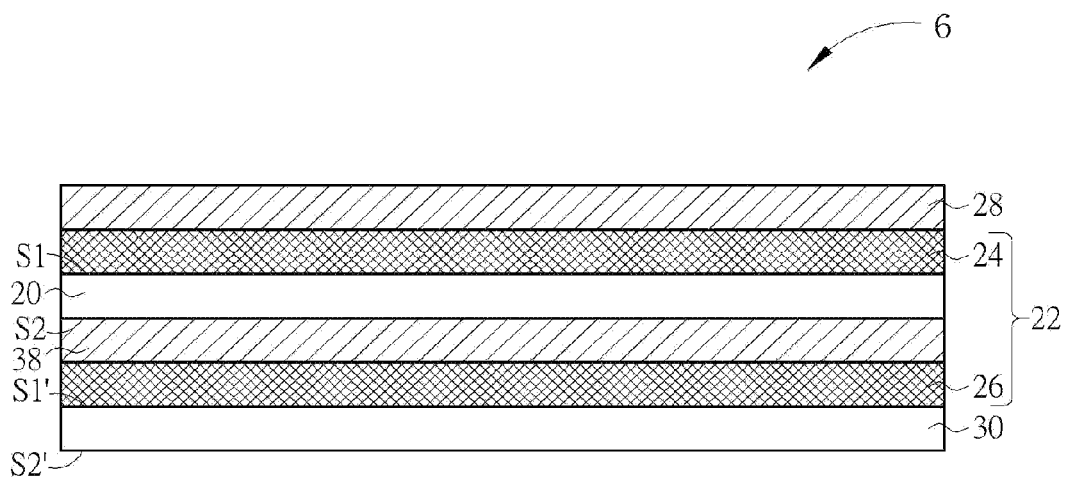
FIG. 6 is a cross sectional diagram showing an optical matching glue applied in a touch panel according to a sixth preferred embodiment of the present invention.

The touch panel of the 6$^{th}$ embodiment is formed as follows:

FIG. 6 is a cross sectional diagram showing an optical matching glue applied in a touch panel according to the sixth preferred embodiment of the present invention. The difference between this embodiment and the 5$^{th}$ embodiment is that the first electrode patterns 24 and the second electrode patterns 26 are disposed on the substrate 20 and on the substrate 30 respectively along the same direction. In other words, the first electrode patterns 24 are disposed on the surface S1 of the substrate 20; the second electrode patterns 26 are disposed on the surface S1' of the substrate 30; the optical matching glue 28 is disposed on the first electrode patterns 24; the optical matching glue 38 is disposed on the second electrode patterns 26; the optical matching glue 28 and the optical matching glue 38 are filled in the gaps of the first electrode patterns 24 and the second electrode patterns 26 respectively, so the surface S2 of the substrate 20 is attached to the surface S1' of the substrate 30 through the optical matching glue 38. In one embodiment of the present invention, a surface S2' opposite to the second electrode patterns 26 of the substrate 30 is the touch surface. In addition, the substrate 20 can be attached to a display module (not shown) through the optical matching glue 28.

In another embodiment of the present invention (not shown), the touch panel 6 further comprises a cover lens attached to the substrate 20 through an optical matching glue 28. Besides, the surface S2' can be attached to a display module (not shown) through an optical matching glue or a normal optical glue. In another embodiment of the present invention (not shown), the touch panel 6 further comprises a cover lens attached to the surface S2' of the substrate 30 through an optical matching glue or a normal optical glue. In addition, the substrate 20 can be attached to a display module (not shown) through the optical matching glue 28.

The manufacturing method of the touch panel 6 comprises the following steps: first, the first electrode patterns 24 is formed on the second surface S1 of the substrate 20, the second electrode patterns 26 are formed on the surface S1' of the substrate 30, wherein the first electrode patterns 24 and the second electrode patterns 26 can be formed at a same time or different times. Afterwards, the optical matching glue 28 is formed on the surface of the first electrode patterns 24, the optical matching glue 38 is formed on the surface of the second electrode patterns 26, the surface S2 is attached to the surface S1' through the optical matching glue 38, thereby completing the touch panel 6. Afterwards, the surface S2 can be deemed as the touch surface, the surface S1 can be attached to a display module through the optical matching glue 28 so as to form a touch display module; or the surface S1 can be attached to a cover lens through the optical matching glue 28, and/or the surface S2' of the substrate 30 can be attached to a display module through an optical matching glue or a normal optical glue, or the surface S2 can be attached to a cover lens. The cover lens and the display module may exist individually or simultaneously, they can also be attached simultaneously or separately. The other components, material properties, and manufacturing methods of touch panel 6 are similar to those of the touch panel of the 5$^{th}$ preferred embodiment detailed above and will not be redundantly described.

In summary, the optical matching glue of the present invention has a refractive index comprised between 1.8~2.1, close to the refractive index of the electrode pattern (such as ITO, having a refractive index comprised between 1.8~2.2) so that by adjusting the refractive index of the optical matching glue, the display defects in the user's interface can be reduced, thereby avoiding forming another optical compensation film, and simplifying the manufacturing processes while reducing the costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A touch panel, comprising:
 a substrate;
 a sensing layer disposed directly on the substrate to directly contact a first surface of the substrate facing away from a touch surface of the touch panel, wherein the sensing layer comprises a plurality of electrode patterns disposed on the first surface of the substrate and arranged in intervals; and
 a first optical matching glue layer disposed on the sensing layer and filled in the intervals, wherein:
  a refractive index of the first optical matching glue layer matches a refractive index of the sensing layer, the first optical matching glue layer comprises:
 an acrylic resin with a weight percentage lower than 20%, wherein the acrylic resin comprises an acrylic oligomer, a urethane acrylate oligomer or a composition thereof;
 an acrylic monomer with a weight percentage in a range between 48% and 58%, wherein a refractive index of the acrylic monomer is greater than a refractive index of the acrylic resin;
 a refractive index matching material with a weight percentage in a range between 25% and 49%;
 a photoinitiator with a weight percentage in a range between 0.5% and 2%;
 an optical stabilizer with a weight percentage in a range between 0.5% and 1%; and an adhesivity enhancing material with a weight percentage in a range between 0.5% and 1%;
 wherein a refractive index of the photoinitiator, a refractive index of the optical stabilizer, and a refractive index of the adhesivity enhancing material are substantially equal, and
 wherein the refractive index of the optical matching glue matches a refractive index of the electrode patterns of the sensing layer.
2. The touch panel of claim 1, wherein:
 the plurality of electrode patterns comprise a plurality of first electrode patterns arranged along a first direction and a plurality of second electrode patterns arranged along a second direction, and each first electrode pattern of the plurality of first electrode patterns and each second electrode pattern of the plurality of second electrode patterns is electrically isolated from one another through an insulating layer.

3. The touch panel of claim 1, further comprising a cover lens, wherein:
a second optical matching glue layer disposed between the substrate and the cover lens, the second optical matching glue layer having a same composition as the first optical matching glue layer, and
the substrate and the cover lens are attached to each other through the second optical matching glue layer.

4. The touch panel of claim 1, wherein:
the first optical matching glue layer is disposed between the substrate and a display module, and
the substrate and the display module are attached to each other through the first optical matching glue layer.

5. The touch panel of claim 1, wherein:
the plurality of electrode patterns comprise a plurality of first electrode patterns arranged along a first direction and a plurality of second electrode patterns arranged along a second direction,
the plurality of first electrode patterns are disposed on a second surface of the substrate opposite the first surface of the substrate and the plurality of second electrode patterns are disposed on the first surface of the substrate, and
the first surface of the substrate is electrically isolated from the second surface of the substrate.

6. The touch panel of claim 1, wherein:
the plurality of electrode patterns comprise a plurality of first electrode patterns arranged along a first direction and a plurality of second electrode patterns arranged along a second direction,
the touch panel further comprises a second substrate,
the plurality of first electrode patterns are disposed on the substrate,
the plurality of second electrode patterns are disposed on the second substrate, and
the substrate is electrically isolated from the second substrate by the first optical matching glue layer.

7. The touch panel of claim 1, wherein:
the plurality of electrode patterns comprise a plurality of first electrode patterns arranged along a first direction and a plurality of second electrode patterns arranged along a second direction,
the touch panel further comprise a second substrate,
the plurality of first electrode patterns are disposed on the substrate,
the plurality of second electrode patterns are disposed on the second substrate, and
the plurality of first electrode patterns and the plurality of second electrode patterns are arranged along a same direction.

8. The touch panel of claim 1, wherein the refractive index matching material comprises transparent nano-titanium dioxide, zirconium dioxide or a combination thereof.

9. The touch panel of claim 1, wherein the refractive index of the photoinitiator, the refractive index of the optical stabilizer, and the refractive index of the adhesivity enhancing material are substantially equal to the refractive index of the acrylic resin.

10. A manufacturing method for forming a touch panel, at least comprising the following steps:
forming a sensing layer on at least one surface of a substrate, wherein the sensing layer includes a plurality of electrode patterns arranged in intervals; and
forming an optical matching glue on the sensing layer and filled in the intervals, wherein a refractive index of the optical matching glue matches a refractive index of the sensing layer; and wherein the optical matching glue comprises:
an acrylic resin with a weight percentage lower than 20%, wherein the acrylic resin comprises an acrylic oligomer, a urethane acrylate oligomer or a composition thereof;
an acrylic monomer with a weight percentage in a range between 48% and 58%, wherein a refractive index of the acrylic monomer is greater than a refractive index of the acrylic resin;
a refractive index matching material with a weight percentage in a range between 25% and 49%;
a photoinitiator with a weight percentage in a range between 0.5% and 2%;
an optical stabilizer with a weight percentage in a range between 0.5% and 1%;
wherein a refractive index of the photoinitiator, a refractive index of the optical stabilizer, and a refractive index of the adhesivity enhancing material are substantially equal, and
wherein the refractive index of the optical matching glue matches a refractive index of the electrode patterns of the sensing layer.

11. An optical matching glue used in a touch panel, wherein the touch panel comprises an electrode pattern, and the optical matching glue comprises:
an acrylic resin with a weight percentage lower than 20%, wherein the acrylic resin comprises an acrylic oligomer, a urethane acrylate oligomer or a composition thereof;
an acrylic monomer with a weight percentage in a range between 48% and 58%, wherein a refractive index of the acrylic monomer is greater than a refractive index of the acrylic resin; a refractive index matching material with a weight percentage in a range between 25% and 49%;
a photoinitiator with a weight percentage in a range between 0.5% and 2%;
an optical stabilizer with a weight percentage in a range between 0.5% and 1%;
and an adhesivity enhancing material with a weight percentage in a range between 0.5% and 1%;
wherein a refractive index of the photoinitiator, a refractive index of the optical stabilizer, and a refractive index of the adhesivity enhancing material are substantially equal, and
wherein a refractive index of the optical matching glue matches a refractive index of the electrode pattern.

12. The optical matching glue of claim 11, wherein the acrylic monomer comprises benzene-containing acrylic monomers.

13. The optical matching glue of claim 11, wherein the refractive index matching material comprises transparent nano-titanium dioxide, zirconium dioxide or a combination thereof.

14. The optical matching glue of claim 11, wherein the refractive index of the optical matching glue is between 1.8 and 2.1.

15. The optical matching glue of claim 11, wherein the refractive index of the photoinitiator, the refractive index of the optical stabilizer, and the refractive index of the adhesivity enhancing material are substantially equal to the refractive index of the acrylic resin.

16. A method for forming an optical matching glue used in a touch panel, wherein the touch panel at least includes an electrode pattern, and the method comprises the following steps:
- providing an acrylic resin of less than 20% weight percentage, wherein the acrylic resin comprises an acrylic oligomer, a urethane acrylate oligomer or a composition thereof; an acrylic monomer comprised in a range of 48%~58% weight percentage, wherein a refractive index of the acrylic monomer is greater than a refractive index of the acrylic resin; and a refractive index matching material comprised in a range of 25%~49% weight percentage in a container;
- mixing the materials mentioned above to form a mixed solution;
- adding a photoinitiator of 0.5%~2% weight percentage in the mixed solution,
- adding an optical stabilizer of 0.5%~1% weight percentage in the mixed solution, and
- adding an adhesivity enhancing material of 0.5%~1% weight percentage in the mixed solution, to form the optical matching glue,
- wherein a refractive index of the photoinitiator, a refractive index of the optical stabilizer, and a refractive index of the adhesivity enhancing material are substantially equal, and
- wherein a refractive index of the optical matching glue matches a refractive index of the electrode pattern.

* * * * *